United States Patent Office 3,421,301
Patented Jan. 14, 1969

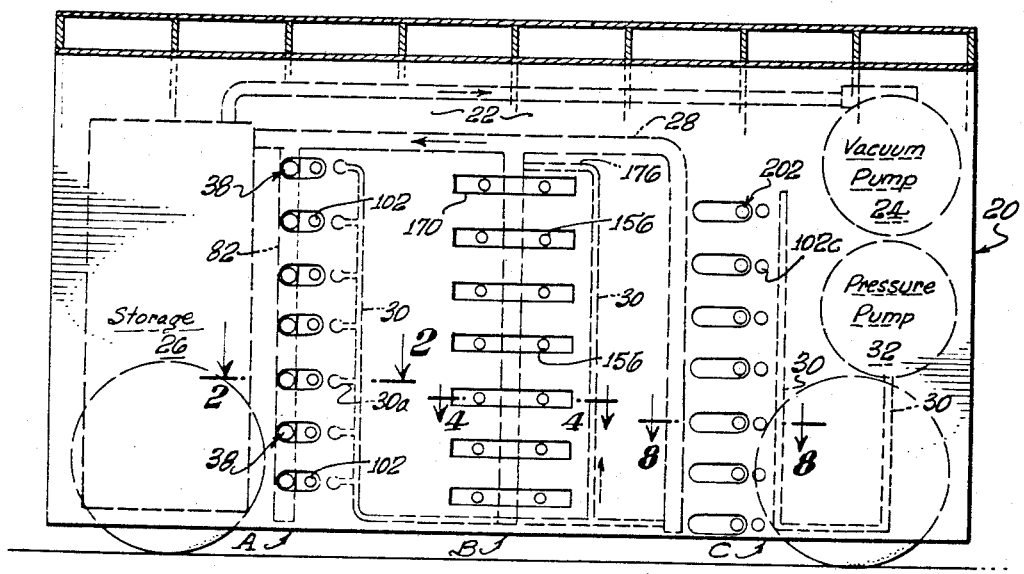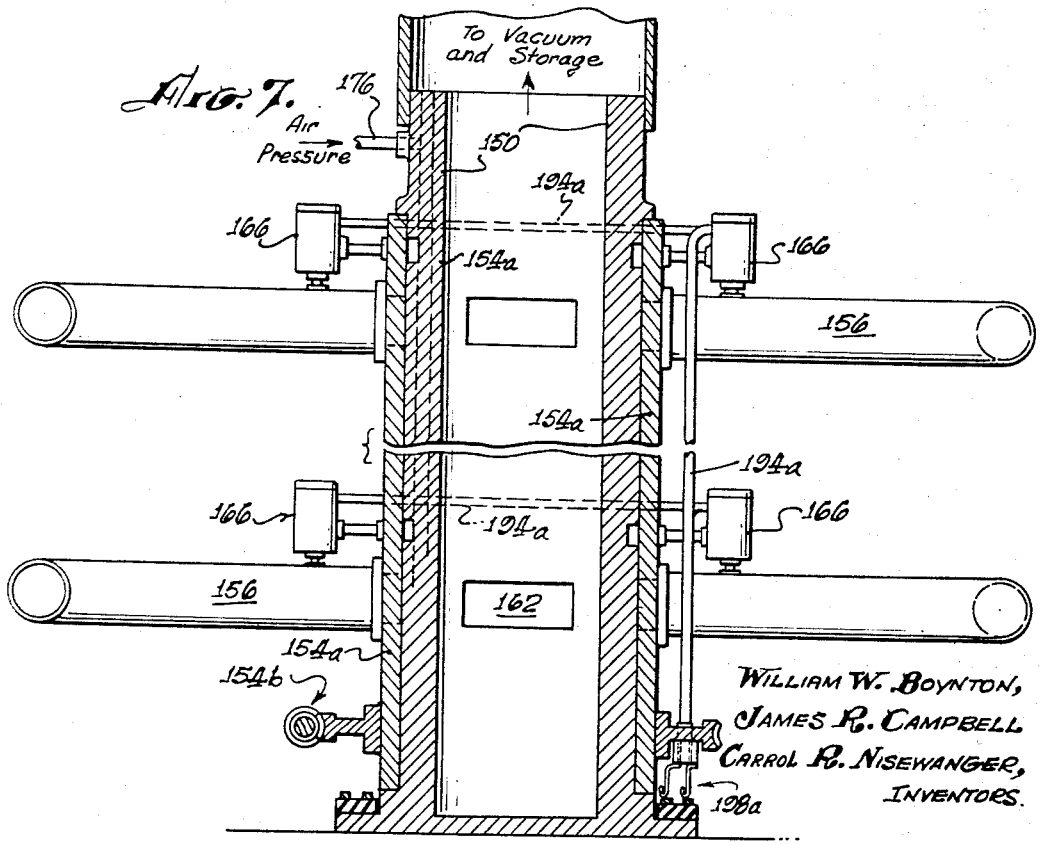

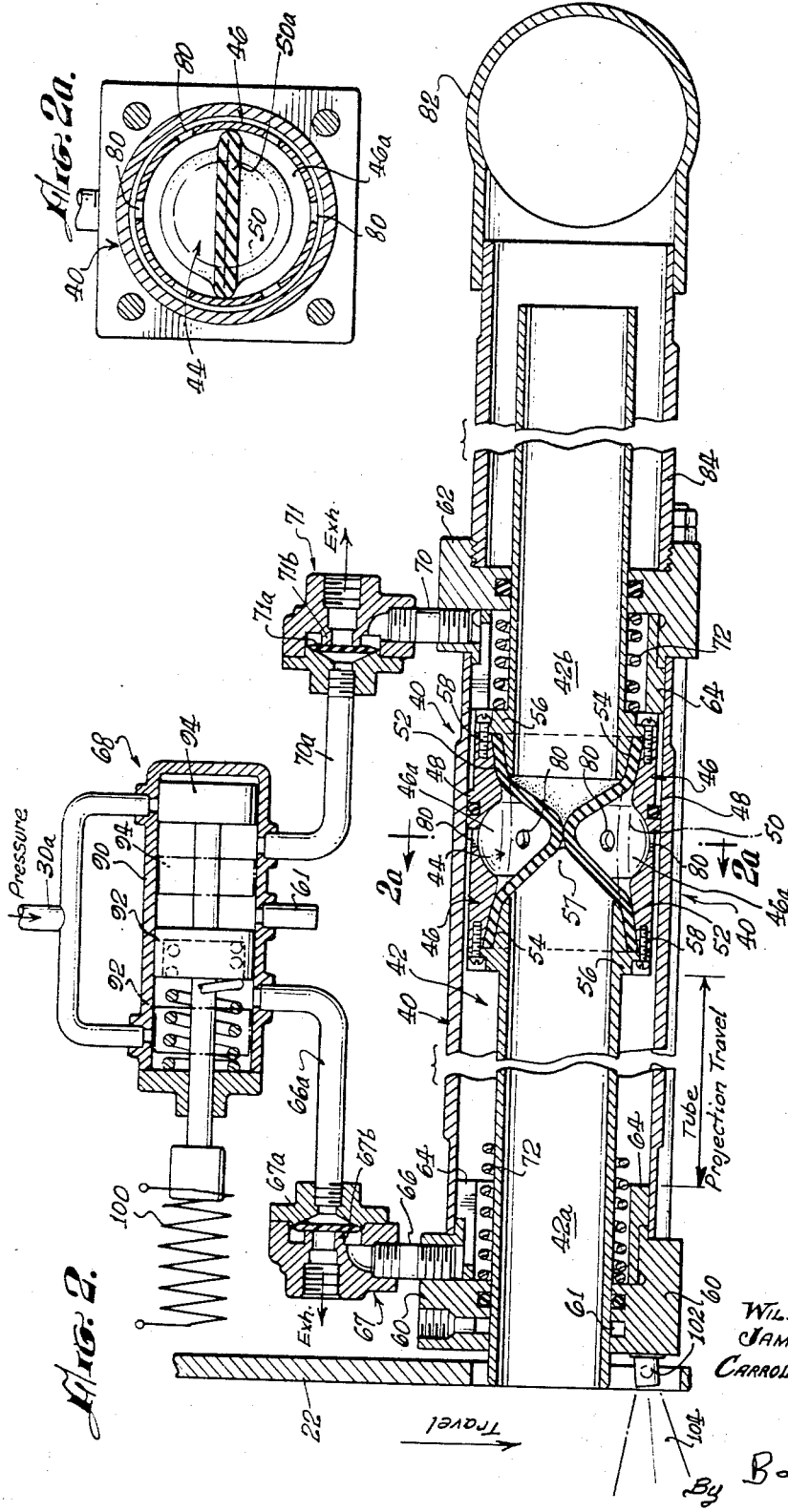

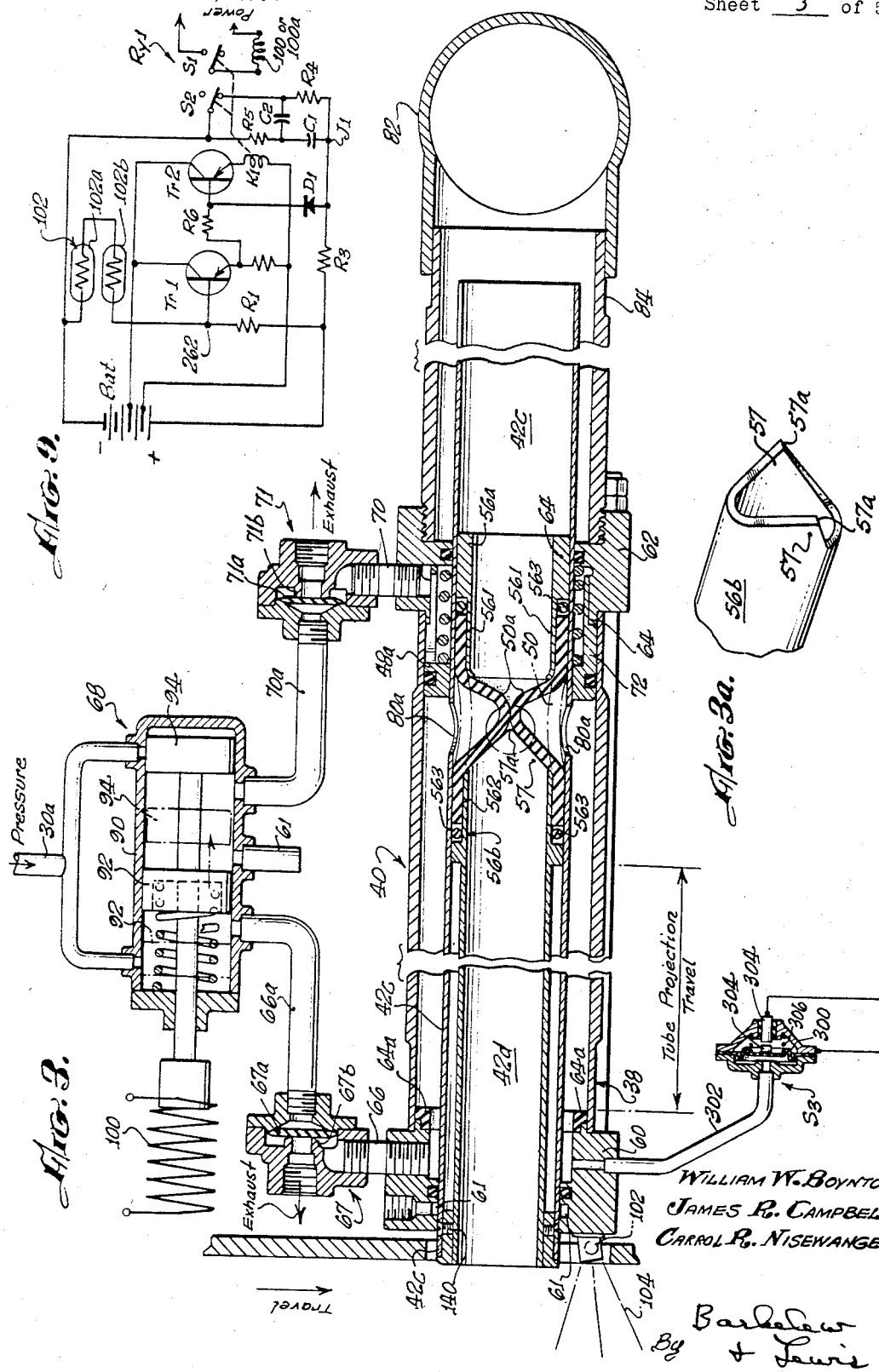

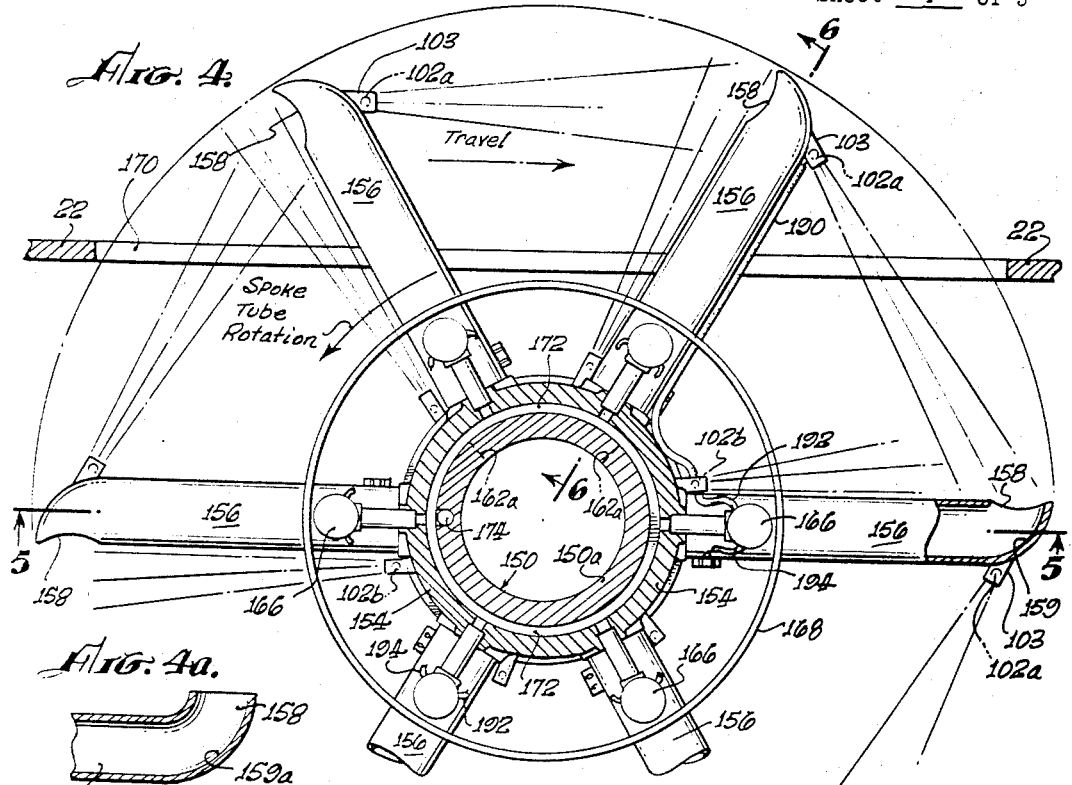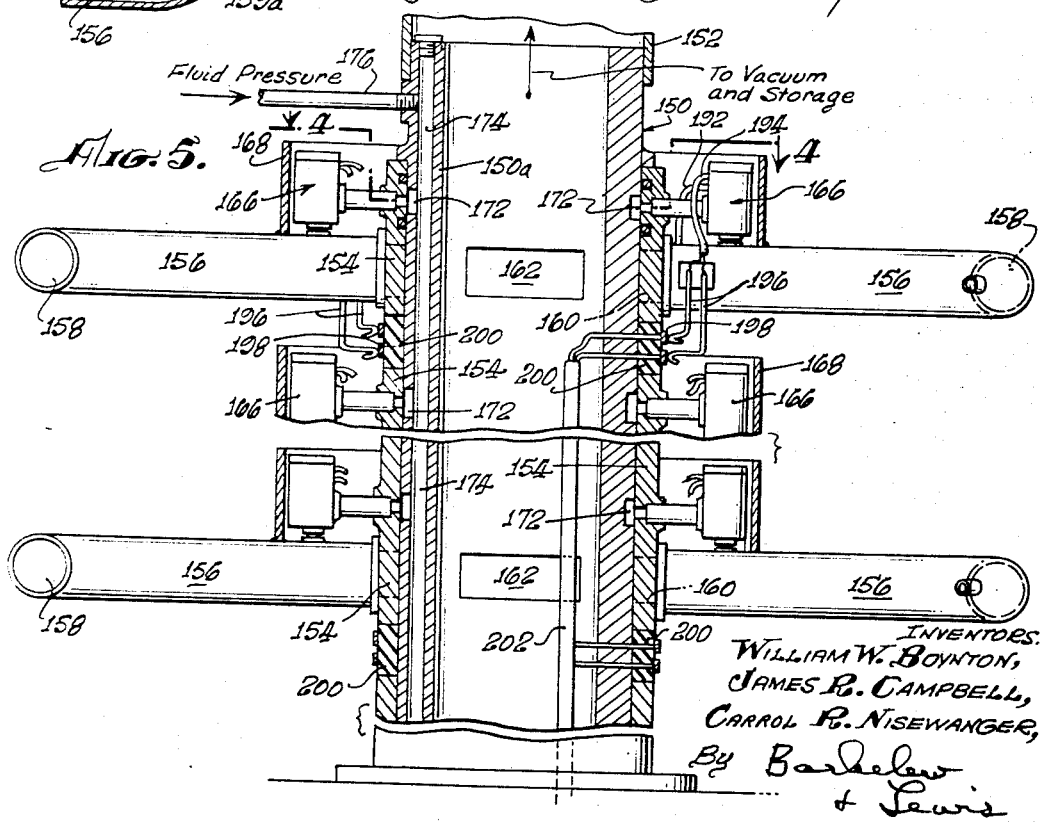

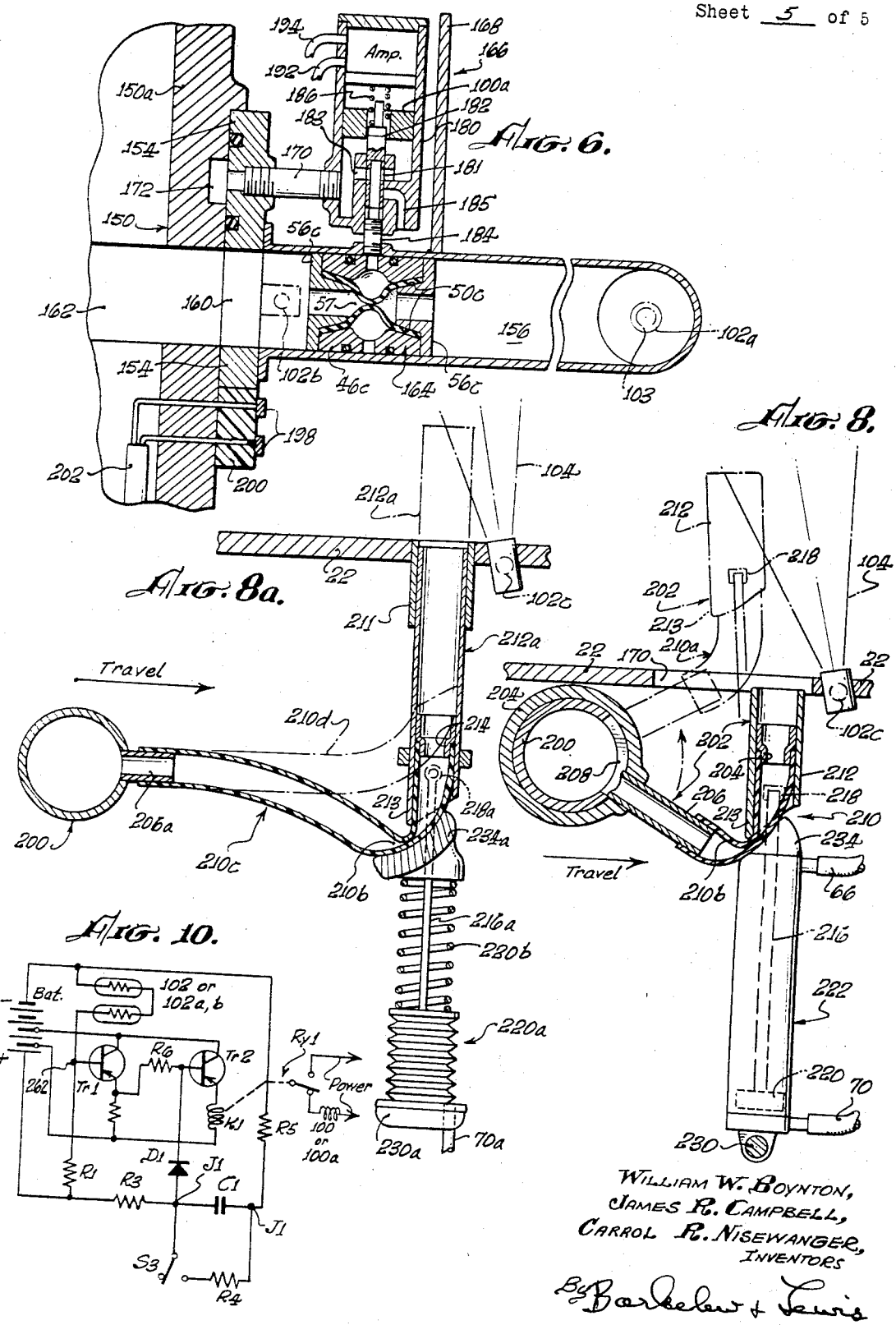

3,421,301
RECOVERY OF PLANT PRODUCTS
William Wentworth Boynton, La Canada, James R. Campbell and Carrol R. Nisewanger, Arcadia, Calif., assignors, by direct and mesne assignments, to William W. Boynton and Leland McCarthy
Filed Oct. 22, 1964, Ser. No. 405,769
U.S. Cl. 56—30            24 Claims
Int. Cl. A01d 45/20

ABSTRACT OF THE DISCLOSURE

Plant products, especially cotton, are harvested by drawing them into suction tubes that are normally closed by individual valves comprising straight tube sections that are resiliently collapsible under super atmospheric pressure. When such products are detected near the inlet of a particular tube, the valve of that tube is opened automatically to cause a sharp, pulse of suction flow. Specific valve structure promotes rapid and reliable closure, while the resilient valve action prevents injury to products accidentally trapped in the valve. Pneumatic mechanism is described for individually projecting each tube with its valve mechanism toward detected plant products.

---

This invention relates to improvements in systems and devices for recovery of plant fruit or product of various kinds whether gathered as growing on plants, entangled in plants or dropped to the ground. The invention in its various forms will be illustratively described as applied to cotton recovery and, particularly, cotton picking from plants; but the invention is not thereby limited as it may be applied to recovery of various plant products here referred to broadly as plant product or fruit.

In the following descriptions several different forms of projecting or projectible picking or recovery devices are set out, including devices embodying units projectible by translation or by swinging or rotation. One of the common characteristics of these several devices lies in their incorporation and use of what is here termed a "straight through" valve controlling the suction that draws the product in from the plant or wherever it may be.

It has been found that, in a suction recovery system, the velocity of the suction air stream necessary for picking up or picking off a product may commonly result in product velocity causing bruising or permanent deformation if the path of suction induced travel causes the product to forcibly strike diverting walls, such for instance as a wall of a suction controlling valve. Tree ripened fruit of any kind may occasionally be irretrievably bruised. And, as an example, it has even been found that the seed of a cotton lock, although encased in soft cotton, may be occasionally broken and thus cause difficulty in ginning.

The invention in its various aspects will be best understood from the following descriptions of several illustrative forms, shown in the accompanying drawings, in which:

FIG. 1 is an elevational schematic illustrating a carrier equipped with the several types of recovery devices shown in the following figures;

FIG. 2 is a section on line 2—2 of FIG. 1 showing illustratively a unit of the recovery device designated A in FIG. 1;

FIG. 2a is a section on line 2a—2a of FIG. 2;

FIG. 3 is a view similar to FIG. 2 showing modifications of the device unit of FIG. 2;

FIG. 3a is a perspective illustrating a preferred form for the end of the internal valve-tube supporting tube;

FIG. 4 is a section on lines 4—4 of FIGS. 1 and 5, showing illustratively units of the device of type B of FIG. 1;

FIG. 4a illustrates a modification of a certain part of FIG. 4;

FIG. 5 is a vertical section on line 5—5 of FIG. 4, showing illustratively that type B of recovery device;

FIG. 6 is an enlarged detail section on line 6—6 of FIG. 4;

FIG. 7 is a vertical section similar to that of FIG. 5, showing a variation of the device of FIG. 5;

FIG. 8 is a section on line 8—8 of FIG. 1, illustratively showing a unit of type C of recovery device;

FIG. 8a shows a modification of the devices of FIG. 8;

FIG. 9 is a schematic illustrating an electrical control system for the several types of recovery devices described here; and FIG. 10 is a similar electrical diagram simplifying that of FIG. 9 and particularly applicable to the mode of operation described in connection with FIG. 3.

FIG. 1 schematically shows a conveyance or carrier 20 with a side wall 22 that may represent either an outer wall of a conveyance travelling between plant rows or one wall of a conveyance tunnel which straddles a row. The conveyance is here schematically illustrated as carrying a vacuum pump 24 which exhausts from a storage chamber 26. Suction pipe or pipes 28 make connection with the units of the several recovery types A, B and C indicated schematically in FIG. 1. And pressure pipe or pipes 30 lead from an air or other fluid compressor 32 to the several recovery units of A, B and C. The other figures illustrate those types of recovery devices or their units. Each device as here shown comprises several vertically spaced units, the units of the several devices A, B and C being shown located vertically in staggered relation. It will be understood that in a system utilizing only, say, one type of device the same or similar staggered relation between the units of several such devices may be used. For instance, if devices only of type A are used in any installation, the several vertically spaced units of several such devices may be so vertically staggered.

FIG. 2 illustrates a unit 38 of device type A. In that figure a fluid pressure operating cylinder is shown at 40 carrying a projectible picking tube 42 made up of two parts 42a and 42b and the body 46 of the straight through valve 44 between them. Valve body 46 has, at 48, a sealed piston fitting in cylinder 40. The valve itself is composed of a resilient rubber-like flexible-walled tube 50 which, without pressure applied to it externally, takes the circular form indicated in broken lines at 50. In that non-pressurized form the tube may be, as shown here, of somewhat expanding diameter toward each end from its longitudinal center. The expanding ends of the tube. as shown here, are wedgingly held between conical surfaces 52 in valve body 46 and opposing inner conical surfaces 54 formed on annular parts 56 which are here shown as integral with the opposed ends of picking tube parts 42a and 42b. Those parts 56 are forcedly secured to the ends of valve body 46 by such fastening means as screws 58 so that the ends of the tubular valve 50 are tightly wedgingly held between the valve body and the parts 54, 56.

Tube parts 42a and 42b are of smaller external diameters than valve body 46 and project out through sealed cylinder heads 60 and 62. The figure shows the picking tube 42 retracted, with the right hand annular part 56 against right hand stop 64, after compressing spring 72, where it is held by pressure applied to the left hand end of cylinder 40 through the pipe 66 leading from the pressure control system involving control valve 68. When valve 68 is thrown, as afterwards explained, it applies pressure to the right hand end of cylinder 40 through pipe 70. That applied pressure moves the piston valve body 44 and annular parts 56 to the left in the figure, the left hand part 56 finally bringing up against left hand stop 64 after compressing left hand spring 72. On movement to the right to the position shown in the figure the piston structure compresses the right hand spring 72 in bringing up against that stop 64. The springs have the functions of reducing the piston impacts on the stops and also of quick acceleration of the piston and the attached tube 42a, 42b in its movements from one position toward the other. FIG. 3 shows, among other things, a variation wherein a gaseous, e.g., air, cushion is fed to the left hand cylinder end to cushion the impact toward or against the stop and to quickly accelerate the piston and tube on the retraction stroke to the right in the figure. Elimination of spring 72 at that end shortens the over-all cylinder lenght.

Pressure applied through 66 to the left hand end of cylinder 40 reaches the exterior of tubular valve 50 through openings 80 located in valve body 46 at the left side of piston 48. Under that external pressure the tubular valve collapses as shown at 50a in FIGS. 2 and 2a, thus closing the valve to shut off application of suction from suction manifold 82 which is connected via tube or pipe 84 with right hand cylinder head 62, that pipe 84 surrounding the open end of tube part 42b. Valve body 46 is hollowed out at 46a to allow valve 50 to collapse to the flattened closed position shown at 50a. Since the described closure of flexible valve 50 is brought about by differential air pressure it is essentially yielding in nature so that any plant product that may be trapped by the closing valve is yieldingly enclosed without cutting action.

To make certain that the flexible resilient tubular valve closes flatly as shown in FIG. 2a, the tube supporting end of at least one internal support part 56, instead of being merely circular, is formed with two opposite tapered projections 57. This information is later more fully described in connection with FIG. 3a.

Valve 68 is here illustratively shown schematically as a piston valve, but may be in any form functioning under the later described controls to throw pressure from one cylinder end to the other. As here shown, the valve has a cylindric body 90 containing two spaced valve pistons 92 and 94. In the spring biased piston position shown the valve passes pressure from pressure connection 30a to pipe 66 to the left end of cylinder 40. When the piston valve is thrown to the broken line position by enerization of solenoid winding 100 it passes pressure from 30a through 70 to the right hand end of cylinder 40. Assuming conveyance travel in the direction indicated photocell 102 beams at 104 on an axis somewhat ahead of the projection axis of tube 42a. As afterward explained, when cell 102 "sees" a fruit, e.g., cotton, its reaction causes energization of solenoid winding 100, throwing valve 68 to its position to feed pressure to the right hand end of cylinder 40, projecting tube 42a. Valve 68 may itself be so constituted as to directly exhaust pressure at 61 through 66 or 70 from the cylinder end opposite that to which pressure is applied. However, to obtain immediate exhaust, dump valves 67, 71 are located in lines 66, 70 close to the cylinder. These commonly known valves have flexible valve closure members 67a and 71a which seat on and overhang exhaust port seats 67b and 71b. On application of pressure from valve 68 through 66a or 70a, the outer overhanging parts of those members flex to pass pressure to 66 or 70. On relief and exhaust of pressure from valve 68 the pressure in cylinder 40 lifts the member 67a or 71a off its exhaust seat thus immediately exhausting pressure from the cylinder end opposite that to which pressure is applied.

Thus, when pressure is applied, e.g., to the right hand end of cylinder 40 to project the picking tube, pressure in the left end of the cylinder is immediately exhausted and relief of that pressure allows tubular valve 50 to immediately expand to open position. Valve 50 thus immediately expands, applying suction to picking tube 42a as it is projected. When that suction draws the fruit, e.g., cotton, into the tube and thence past open valve 50 into the vacuum manifold, to be drawn then or later into storage compartment 26, cell 102, no longer seeing the cotton which has been drawn into 42a, ceases reaction, solenoid 100 is de-energized and valve 68 returns to the biased position in which it applies pressure to the cylinder left end, exhausting the right end, and returning the parts to the retracted position shown and applying pressure to close suction valve 50. The electrical circuiting included in each unit for causing energization of solenoid 100 under control of the reaction of cell 102 is described later. The outward projection of tube 42a, indicated by "tube travel" on the drawing is, for e.g., cotton, about nine inches. There will be a plurality of the recovery units shown in FIG. 2 spaced vertically on manifold 82, as indicated in FIG. 1; each with its photocell, control valve and the electrical circuiting from the cell to the actuating solenoid.

FIG. 3 shows a variation of the recovery unit of FIG. 2. The general mode of operation in FIG. 3 is the same as has been described for FIG. 2, controlled by the reaction of photocell 102 and the solenoid actuated valve 68 of that figure. Parts shown in FIG. 3 that are the same as in FIG. 2 are given the same numerals. The differences in FIG. 3 over the form of FIG. 2 have mainly to do with simplification and the mounting of the tubular valve member with a view to making that member easily and quickly replaceable, and with the substitution of an air cushion for the left hand cushioning spring 72 of FIG. 2.

As shown in preferred form in FIG. 3, the picking tube 42 is mainly made up of an outer tube 42c which extends in one length through cylinder heads 60, 62, with length allowance for tube projection. FIG. 3 shows the tube in retracted position where its inner (right hand) end extends far enough beyond cylinder head 62 to allow for tube projection. The sealed piston 48a is mounted directly on tube 42c, and is here shown at the right hand or retracted end of its travel against right hand stop 64.

The flexible, resilient tubular valve member 50, 50a is, in operative position, carried at its ends on members 56a and 56b, with its longitudinal center to the left of piston 48a and opposite openings 80a in the wall of tube 42c. Those openings provide for pressure access from the left end of cylinder 40 to the exterior of the tubular valve, and also provide space for the flattening and closure of the valve.

As here shown, the right hand end of tubular valve 50 is fitted tightly over or vulcanized on a part 561 of 56a. The other valve end is similarly fitted over part 562 of member 56b which is formed on the inner, right hand, end of a tube 42d, whose outer, left hand, end extends to the outer, left hand end of main tube 42c. The ends of valvular tube 50 where they are fitted over 561, 562 may fit more or less tightly in main tube 42c, but in any case O-rings at 563 prevent air leakage past the valve in tube 42c. Members 56a and 56b may fit somewhat loosely in tube 42c.

Tube 42d, valve 50 and parts 56a and 56b form a unit that, with pressure off the O-rings, may easily be removed from and inserted in main tube 42c, and held in position by some simple securing means, such as the screws shown at 140. By removing such securing means the whole unit may be removed and a new valve substituted for one deteriorated or broken down.

In FIGS. 2 and 3, pressure fluid from lines 66 may be fed to the groove 59 to flush out any dirt from the clearance between the picking tube and cylinder head 60.

As has been mentioned in connection with FIG. 2, the inner tubular mount for at least one end of the flexible collapsible valve tube 50 is provided with opposed tapered projections 57 to insure flat and tightly closed collapse of the tubular valve. Such tapered projections are shown at 57 in both FIGS. 2 and 3, and in the detailed perspective of FIG. 3a. It has been found that projections with edges making an angle of about 45° with the axis of the tubular mounting port give the surest result. That approximate angle is shown in the figures, resulting in angles of about 90° at the points 57a of the tapered projections. These tapered projections are also applicable to the tubular valve mountings of FIGS. 4 to 6 and 7.

Flattened collapse of the tubular valve, with one side flatly against the opposite side, as shown e.g. in FIG. 2a is, as far as known, the only manner of completely closing that valve. The projections 57 insure that collapse under imposed external fluid pressure. Such flattened collapse tends to change the axial length of the flexible tube and the fact that one end of the tube—the one at the right in FIG. 3—is relatively freely axially movable with relation to the left-hand fixed end facilitates that collapse and the following expansion to normal form. Assuming that 56a and the right-hand end of valve tube 50 do not fit tightly in 42c, only the frictional engagement of the O-ring 563 with 42c, which may be slight, holds that end of the valve tube against axial movement. As regards that movement, that end of the valve tube may be said to float.

Although the general mode of operation in FIG. 3 is the same as described for FIG. 2, the left hand abutment spring 72 of FIG. 2 is in FIG. 3 replaced by a compressed air cushion. As shown in FIG. 3, an annular stop 64a of rubber or similar material forms the final left hand stop for piston 48a. As is later explained in connection with the control systems shown in FIGS. 9 and 10, valve solenoid 100, normally de-energized, feeds pressure to the left end of cylinder 40 to hold the picking tube retracted and valve 50 closed. On actuation by the reaction of cell 102, solenoid 100 is energized for an adjusted and limited time only to throw pressure through 70 to the right hand end of the cylinder to project the picking tube. The controlled timing is such that, with piston 48a approaching stop 64a, solenoid 100 is de-energized, throwing valve 68 to then feed pressure, preferably gaseous here, to the left end of the cylinder to form a resilient stop for the piston. The timing is such that that takes place to bring the piston to a positive stop either at or close to the stop 64a. Continued de-energization of the solenoid then causes immediate retraction of the picking tube, if retraction has not previously been caused by reaction cessation of cell 102. Incidentally, it has been found that in this mode of operation the right hand dump valve 71 may be omitted, exhaust from the right end of the cylinder then taking place to 61 through valve 68.

FIGS. 4 to 6 show another type of recovery device and unit utilizing the same kind of collapsible valve tube as in FIGS. 2 and 3. In FIGS. 4 to 6, also in FIG. 7, the picking tube or tubes of the units are projected by rotation, caused by dragging on plants, etc. This type of device is indicated at B in FIG. 1.

Referring first to FIGS. 4 and 5, a vertical vacuum manifold tube or pipe is shown at 150 connected via pipe 152 to the suction line 28 (FIG. 1) leading to the vacuumized storage bin. The lower end of 150 is closed. A plurality of freely rotatable sleeves 154 surround manifold 150, each sleeve carrying a number of spoke-like tubes 156 open at 158 at their outer ends and communicating through sleeve openings 160 (FIG. 6) and manifold slots 162 with the interior of the vacuum manifold. See FIG. 6. As indicated in FIGS. 4, 5, slots 162 extend only partially around the manifold wall, preferably only between such lines as indicated at 162a in FIG. 4, communicating only the inner ends of the spoke tubes that, in rotation, project beyond wall 22. Each tube contains a straight-through valve unit 164 (shown in detail for one tube in FIG. 6) similar, e.g., to the valve unit of FIG. 2. Each valve unit is actuated by the pressure control valve contained in a unit 166 mounted on each individual tube, and a guard 168 may surround units 166 to protect them and associated parts from any plant matter that may enter through the tube projecion slot 170 in wall 22. Each valve unit 166 gets its fluid pressure via a tube 170 which communicates through sleeve 154 with a circumferential pressure groove 172 in wall 150a of manifold 150. The several grooves 172 are fed with fluid pressure from a hole 174 extending vertically in the wall of the manifold, pressure being fed to that hole by a pipe 176 connecting to the pressure pipes 30 of FIG. 1. In this form of device the fluid pressure may well be liquid pressure.

A typical make-up of each control valve unit 166 is illustratively shown in FIG. 6. As shown there pressure goes via 170 to the lower part of casing 180 and then, in the normal biased position of reciprocating valve 182, via pipe 184 to the valve unit 164 in the spoke-tube 156. Like the valve unit of FIG. 2, unit 164 has the tubular resilient collapsible suction valve member 50c clamped at its ends between valve body 46c and clamping members 56c. As in FIGS. 2, 3, application of pressure exteriorly of 50c causes valvular tube collapse and closure; removal of that pressure allows the valvular tube to open. A spring 186 biases control valve 182 down to pressure passing position, and solenoid winding 100a on energization moves that valve up.

In the biased normal lower pressure passing position of valve 182 its ports 181 register with the pressure ports 183 to feed pressure through its hollow interior from 170 to 184. On upward movement by energization of solenoid 100a valve ports 181 move out of register with 183 and the lower valve end uncovers exhaust port 185 to exhaust pressure from valve unit 164 to allow that valve to open. The amplifying and other portions of the circuiting for each spoke tube 156, controlled by the photocell or cells and feeding the amplified current to the solenoid winding, may be contained in the unit labelled "AMP."

Each spoke tube 156 may carry one, or preferably two, photocells. One such cell is shown at 102a beamed by tube 103 on opening 158 of the following spoke tube. A second cell 102b mounted on sleeve 154 may be similarly beamed across the beam of 102a directly in front of the outer end opening 158 of the following tube. As explained later either the single cell 102a, or the two cells together, may control the amplifying circuiting leading to the solenoid. Illustratively, a two wire cable 190 is shown connecting the two photocells into a two wire circuit of cable 192 leading to the amplifier. Power supply for each amplifier is here shown as fed by cable 194 leading from a pair of contact fingers 196 which ride slip rings 198 mounted on insulating rings 200 stationary on manifold pipe 150. These slip rings may be fed with power by e.g., the conductors shown at 202 in FIG. 5; and the slip rings may only conductively extend around the manifold to supply amplifier power through approximately the same angle of spoke rotation that slots 162 supply vacuum to the several spokes. Conductors 202 are here shown simply as being within the manifold. They may, however, be located in a conduit hole, like hole 174, in the manifold wall.

In FIGS. 4, 5 and 6 the several spoke tubes 156, and their appurtenances and connections, mounted on the individual sleeves 154 comprise an independently rotatable unit. Each such unit is independently rotated, in the direction indicated in FIG. 4 relative to the travel direction there indicated, by the drag of plants on the spoke tubes that project out from wall 22. On the other hand, the several units on each manifold may be positively driven in that direction of rotation at a speed giving the projecting spoke tubes an outer end velocity comparable to the speed of conveyance travel. FIG. 7 schematically shows the application of such a drive.

In FIG. 7 the parts that are the same as in FIG. 5 are given the same numerals. Details, except as explained below, are the same as in FIGS. 4–6, and are not shown in FIG. 7. The compressed air or other pressure fluid supply to each unit may, for example, be the same as in FIGS. 4–6. However, seeing that the units all rotate together, the compressed fluid supply to the several units may be via a single annular groove such as 172 in FIG. 5, and distributed from that groove to the several valve units 166.

In connection with FIG. 7 it is remarked that, instead of the whole group of units being positively driven, they may be driven as a whole by contact with the plants. The same would be true in FIG. 5 if the mounting sleeves 154 of the several units, instead of being individually rotatable, were rotatably interconnected to rotate together. The difference over FIG. 5 is mainly in the fact that, instead of each set of spokes 156 being mounted on an individual sleeve 154, all the spoke sets are mounted on a single sleeve 154a. That single sleeve shown as driven at 154b. And, seeing that the spokes rotate together, a single power supply cable 194a may lead to the several control valve units 166 from a single slip ring and contact assembly such as is shown at 198a.

FIG. 8 shows a unit of the type of device indicated at C in FIG. 1. In this type of unit a swinging recovery tube is projected under photocell control and, as in FIGS. 2, 3 and 4 to 7, the suction control is by the same general type of tubular valve operated in conjunction with picking tube projections. As indicated in FIG. 1, a plurality of these units may be mounted on such a vertical suction manifold as is shown at 200.

In FIG. 8 each recovery tube unit 202 is mounted at its inner end on an individual rotatable sleeve 204, the inner end of tube 206 communicating through a slot 208 with the interior of suction manifold 200. In the illustrative form shown here tube 206 is rigid and carries at its outer end the flexible resilient tubular valve member 210 which is, until collapsed to closure, of the general shape curved in plan that is shown in broken lines at 210a. As will become apparent, valve tube 210 opens from kinked flattened closure on projection and takes its normal open form as shown at 210a.

The outer end of the tubular valve member 210 carries an outer rigid tubular end member 212 rigidly secured to the end of 210 at 214. The outer end of a piston rod 216 is rigidly connected at 218 to member 212. That rod carries a piston 220 operating in a cylinder 222 to the ends of which the pressure pipes or hoses 66 and 70 lead from such a control valve as that shown at 68 in FIG. 2, that control valve being actuated by solenoid 100 as in that figure, and the solenoid being here controlled by a photocell 102c mounted on or in wall 22 and beaming out on an axis generally parallel to the axis of 212 when projected. Cylinder 222 is shown as pivotally mounted at 230, and the throw of piston 220 in cylinder 222 is sufficient to throw the whole picking tube 206, 210, 212 from such a position as shown in full lines where 212 does not project appreciably beyond wall 22, to such a projected position as shown in broken lines. The direction of swing is such that after cell 102c "sees" a fruit, the projection carries 212 out to a position somewhat behind the retracted full line position—behind with relation to the direction of conveyance travel.

Control and operation for projection and retraction is the same as has been described in connection with FIG. 2. The collapsing closure of tubular valve 210 is here however caused mechanically by tube bending and kinking. In the retracted position shown in full lines the normally curved tube 210 is forcibly drawn back against a stop 234 here shown as carried on the outer end of cylinder 222. The inner end of 212 has an extension 213 that, on retraction presses against the inner concavely curved side of 210 to kink it. Engagement between 213 and stop 234 kinks tube 210 to such a flattened and closed form as shown at 210b, shutting off vacuum application to 212. On outward swinging movement from the retracted position, moving 213 and 210 away from 234 the flexible tube resiliently takes its normal open form applying the suction to 212.

It is remarked that the abutment stop 234 is not necessarily carried by cylinder 222; it may be mounted stationarily in any suitable manner. And the controlled tube projection means does not necessarily involve such a projecting and retracting cylinder-piston as shown at 220, 222. A typical indication of such modifications is shown in FIG. 8a. In that figure parts that are the same as in FIG. 8 are given the same numerals.

In FIG. 8a the flexible and collapsible tube 210c is shown extended and directly connected at 206a with the stationary manifold 200. Outer rigid tube 212a is here shown as longer than 212 in FIG. 8 and is projectible on or in a suitable guide, e.g., the guide sleeve 211 mounted on wall 22. Connection of the outer end of 210c with 212a may be the same as in FIG. 8, tube 210c taking such a curved position as shown at 210d on projection of 212a. On retraction of 212a, its part 213 bends and kinks tube 210c against stop abutment 234a as in FIG. 8; 234a being here stationarily mounted on any stationary part of the device, e.g., on manifold 200 or wall 22.

FIG. 8a also shows another means of projecting the outer end of the picking tube in swinging motion about manifold 200. A Sylphon bellows 220a, mounted at 230a on any stationary part is connected by rod 216a at 218a with 212a. The bellows is normally contracted to retract the tube by e.g., a spring 220b and expanded by fluid pressure through 70a which may be valvularly controlled like 70 in FIGS. 2 and 3, or like 184 in FIG. 6.

All of the tubular collapsible valve members described here are resiliently flexible so that, on release from collapsing or kinking pressures, they immediately take their normal open forms. Tubing or hose of the type of soft flexible rubber that will flatten to close and resiliently resume normal open form is indicated.

Elimination of end walls or sharp curvatures has been spoken of and the valves themselves characterized as being straight through. That is specifically true of the tubular valves of FIGS. 1 to 7; and the open tubular valves of FIGS. 8, 8a are substantially straight with soft walls. The entrance wall curvature at 159 in FIG. 4 may, if desired, have the curvature decreased by, for instance, increasing its radius as indicated illustratively at 159a in FIG. 4a.

Those relatively straight suction tubes, without sharp or angular changes in direction and with the contained straight-through tubular valve, discharge at their inner ends into chambers or manifolds of much larger cross-sectional size where the fluid movement is relatively slow and also transverse of the movement through the tubes. See e.g., the relative sizes of tubes and manifolds in FIGS. 2, 3, 4 and 8. Those facts slow down the movement of fruit, e.g., cotton, before the possibility of striking an opposite wall.

The free floating of one end of the tubular valve has been spoken of in connection with FIG. 3. In FIGS. 8 and 8a, while one valve tube end is fixed by its attachment to tube 212 or 212a, the other end is freely movable to facilitate kinking collapse. In FIG. 8 that other end can move freely to accommodate axial length changes because of free movement of tube 206 to which that end is attached; and in FIG. 8a the long flexibility of 210c provides the same accommodation.

FIG. 9 is a schematic diagram of an illustrative electrical system for controlling action of a picking unit in response to photoelectric signals. Such a system is provided for each picking unit, except that all may utilize a common power source. FIG. 9 shows photocells 102 or 102a and 102b in series, and circuitry for energizing valve solenoids 100, 100a in response to incidence of light from a fruit upon the photocell or cells. The cell or cells are selected for selective sensitivity to the light reflected from the fruit being recovered or picked. For instance, for cotton a cell or cells having a sharp peak of sensitivity at about 5000 angstroms has been selected.

Photocells 102 are shown illustratively as photoconductive cells of conventional type having a resistance that is high when the cell is dark and that decreases essentially linearly with increasing illumination of the cell. Cell 102, or the two cells in series for the form of FIGS. 4–6, are connected in series with the resistance R1 across a source of direct current voltage, shown as the battery "Bat," with the polarity shown. That battery typically produces 135 volts and is tapped to provide intermediate voltage values as desired. The voltage of junction 262 then varies with the resistance of the photoconductive cell or cells, providing a voltage signal that represents the illumination of the cell or cells. For the units of the figures other than 4–6, or for those figures if only one cell, such as 102a, is used, one of the cells of FIG. 9 will be omitted. The signal is amplified by the two-stage amplifier comprising the transistors Tr1 and Tr2 of PNP type connected in a conventional common collector circuit with the winding K1 of the relay Ry1 as output load. The system is so biased that with the cell or cells exposed to the normal background of e.g., illuminated cotton plants both transistors are cut off and the relay is idle. When the cell or cells "see" a white cotton lock, junction 262 becomes more negative, switching transistor Tr1 to conductive condition in response to a white area of predetermined size, typically a small fraction of a normal cotton boll or lock. Tr2 than draws current through K1, actuating the relay.

Relay Ry1 includes the normally open switch S1 and the normally closed switch S2. S1 is connected in series with a suitable power source and the controlling solenoid winding 100, 100a. Hence relay actuation directly operates the described control valve, projecting the picking tube and/or opening its suction as already described. On relay deactuation, as when the photocell or cells no longer see the drawn in cotton lock, solenoid 100, or 100a is idled, retracting the picking tube to normal rest position ready for another operation and/or cutting off the picking suction. The tube is normally retracted in that manner or the suction cut off when the cotton is picked or when it otherwise disappears from the field of the photocell or cells.

If the cotton distribution is dense, a second lock may come into the field of view of photocell or cells 102 before the initial lock is picked, tending to maintain the picking tube of the form of FIGS. 2, 3 or 8 continuously in extended position. That, when the picking tube is projected under cell control, would limit the picking range of the tube to an extreme reach, leaving nearer locks unpicked; and would also tend to carry the branches of the cotton plant along with it as the machine moves along the row, damaging the plants. Such difficulties are avoided by providing a time control that over-rides the normal photocell control, returning the picking tube to normal position after a set interval following each projection. In the present system that over-ride action is timed by a timing circuit under control of relay switch S2. That circuit utilizes the time constant of a resistance and charging capacitor in series, and applies a control signal directly to the base of second stage transistor Tr2. The timing control is only used for such projection systems as e.g., in FIGS. 2, 3 and 8.

When relay Ry1 is idle with S2 closed, the voltage dividing resistances R3 and R4 are connected in series across the battery. The junction J1 of R3 and R4 is connected to the base of Tr2 via the diode D1 with the polarity shown. The components are selected to make junction J1 normally more negative than the transistor base, the diode then isolating the transistor. The capacitor C1 and resistor R5 are series connected in shunt to R4 and C2. In idle condition of the system C1 is charged to a potential equal to the voltage drop across R4. The capacitance C2 is preferably connected as shown for the reasons to be described below.

At the start of a picking operation, relay actuation opens the direct connection of R4 to the negative battery terminal, but leaves the network C1, C2 and R4 in series with R3 and R5 across the battery. Hence C1 begins to charge through R3 and R5, and C2 charges through those resistances in series with R4. The potential of junction J1 thus approaches that of the positive battery terminal. As soon as that junction becomes more positive than the base of Tr2, diode D1 conducts, tying the base potential to 272 and over-riding the normal control via Tr1 and photocell or cells. As junction J1 reaches a critical potential, transistor Tr2 is cut off, releasing the relay. By suitable selection of the charging time constant of C1 and C2 with respect to the constants of the system, the maximum dwell time of a picking tube in extended position can be set at any desired value. A dwell time of about ¼ second is illustrative.

Presence of R5 prevents excessive loading of R3 during the charging of C1. The distribution of the effective capacitance between C1 and C2 tends to stabilize the system against relay oscillation. Presence of C2 also accelerates the return of the system to normal rest condition following release of the relay. Closure of switch S2 may be viewed as shifting capacitors C1 and C2 from parallel connection with both capacitors charged to series connection with their directions of charge opposed. The charges are thereby partially neutralized, restoring junction J1 to its rest potential with minimum delay. The system is thus returned promptly to control by the photocell or cells, ready for another picking cycle.

FIG. 10 is similar to FIG. 9, except that the timing circuit here is changed to time the cut-off to solenoid 100, 100a at an adjusted time interval after solenoid energization. In that regard the control circuit of FIG. 10, although applicable to all forms, is particularly applicable to the system of operation described in connection with FIG. 3.

In FIG. 10 the parts that are the same as in FIG. 9 are given the same designations. In FIG. 10 the timing circuit including the parts S2 and C2 of FIG. 9 are not used, and pressure operated switch S3 in shunt with R4 around C1 is added. Pressure operated switch S3 is biased to be normally open and closes when subjected to a predetermined pressure, say 50 p.s.i. Such a switch is shown schematically in connection with FIG. 3. As shown there the switch is operated by a diaphragm 300 to one face of which pressure from the left hand end of cylinder 40 is applied via 302. The switch, comprising contacts 304 is biased open by spring 306.

The picking tube is projected by energization of solenoid 100, 100a when the cell or cells 102 react, as before described. At that time, with pressure applied to the right hand end of the cylinder, switch S3 is open. With S3 open condenser C1, no longer by-passed by resistance R4 (of low value) begins to charge in such direction that the voltage at its junction J1 with R3 becomes sufficient to cause transistor Tr2 to stop conducting, de-energizing relay K1 to open switch S1. Resistors R3 and R5 with C1, establish the time delay after the time that solenoid 100 is energized. Energization of the solenoid, as before explained throws pressure to the right hand end of the cylinder 40 to project the picking tube.

The delay time is adjusted to de-energize solenoid 100, with the result of throwing pressure to the left hand end of the cylinder as piston 48a approaches the final stop 64a. The pressure cushion, here gaseous, slows the piston and tube projecting movement before reaching 64a. When the pressure in the left cylinder end reaches full value, or the value for which switch S3 is biased (which may be when the piston and picking tube are fully retracted) that switch is closed and remains closed until pressure is released from the cylinder left end by subsequent energization of solenoid 100. With switch S3 closed the circuit is reset for a subsequent operation under control of cell 102 when R4 rapidly discharges C1.

We claim:
1. In a system for recovery of plant products and the like, the combination of
    a fluid pressure cylinder with inner and outer end heads,
    a projectible suction tube extending axially through the cylinder and its heads and having an outer end projectible beyond the outer end head of the cylinder,
    means applying fluid suction to the inner end of the suction tube, a piston formation incorporated with an intermediate part of the suction tube between the cylinder heads and cooperating with the cylinder, a straight-through suction controlling valve incorporated in the length of the suction tube, and movable therewith, said valve being formed of a resiliently flexible tubular member sealingly connected at its spaced ends with the wall of the suction tube, an intermediate portion of said tubular valve member resiliently taking an interiorly open form for fluid passage therethrough and being forcibly resiliently collapsible intermediate its ends to a flattened form in which it closes off flow through it from one end to the other, said valve member located in the length of the suction tube outward of the piston formation, and said suction tube being formed to admit pressure externally to said valve member from the cylinder end outwardly of the piston formation, means selectively reactive to radiation reflected from the product in the vicinity of the outer open tube end, and means controlled by the reactive means to alternatively apply fluid pressure to the inner and outer ends of the cylinder dependent upon presence and absence, respectively, of said reactance.

2. The combination defined in claim 1 and in which said means controlled by the reactive means includes timing means acting to apply fluid pressure to the outer end of the cylinder at a timed interval after application of fluid pressure to the inner end of the cylinder.

3. In a system for recovery of plant products and the like, the combination of a flexible suction tube having a wall of resiliently flexible material adapted by resiliency to take an interiorly open form after being laterally collapsed to bring opposite parts of its wall together for closure of passage through said tube, means for applying suction to one end of said tube, a rigid tubular member sealingly joined to the other end of said flexible tube, means for projecting and retracting said rigid tubular member along a predetermined line of movement, a relatively fixed abutment, the joined end of said rigid tubular member on retraction pressing against said flexible tube and pressing that tube against the fixed abutment to press the walls of that tube together.

4. In a system for recovery of plant products and the like, the combination of a suction manifold, a sleeve swingingly rotatable about said manifold, a suction tube projecting radially from the sleeve with an outer open product receiving end and internally in communication with the suction manifold, said suction tube incorporating in its length a straight-through suction controlling valve, said valve being formed of a resiliently flexible tubular member sealingly connected at its spaced ends with the wall of the suction tube, an intermediate portion of said tubular valve member resiliently taking an interiorly open form for fluid passage therethrough and being forcibly resiliently collapsible intermediate its ends to a flattened form in which it closes off flow through it from one end to the other, means selectively reactive to radiation reflected from the product in the vicinity of the outer open tube end, a cylinder and piston unit with a piston rod attached at its outer end to the outer end of the suction tube, means alernatively applying fluid pressure to opposite ends of the cylinder dependent upon presence or absence of reaction of the reactive means, and means brought to bear on the tubular valve member by virtue of inward swinging of the suction tube toward the cylinder and acting to physically bend and crimp said valve member to its flattened form.

5. The combination defined in claim 4 and in which the suction tube is made up of an inner rigid tubular part rigidly mounted on the sleeve, an outer rigid tubular part forming the outer end portion of the suction tube, and the tubular valve member is intermediate the said two rigid tubular parts, said piston rod being rigidly connected to said outer tubular part, and said outer rigid tubular part having a projection that bears on the tubular valve member to bend and crimp it to flattened form when said outer tubular part is moved toward the cylinder.

6. In a system for recovery of plant products, the combination of a suction manifold, a sleeve rotatable about said manifold, a plurality of spoke-like suction tubes mounted at their inner ends on the sleeve and projecting radially therefrom in angularly spaced relation, each tube having an outer open end adapted to draw in the product by suction, the plurality of tubes being rotatable with the sleeve about the suction manifold, the inner ends of the several tubes communicating with the interior of the suction manifold, and suction control means for each said spoke-like tube comprising a normally closed valve in the tube controlling application of suction to the outer end of the tube, means selectively reactive to radiation reflected from product in the vicinity of the outer end of a tube, and means controlled by the reactance of said means and acting to open said valve.

7. The combination defined in claim 6 and in which said valve comprises a straight-through suction controlling valve incorporated in the length of the suction tube, said valve being formed of a resiliently flexible tubular member sealingly connected at its spaced ends with the wall of the suction tube, an intermediate portion of said tubular valve member resiliently taking an interiorly open form for fluid passage therethrough and being forcibly resiliently collapsible intermediate its ends to a flattened form in which it closes off flow through it from one end to the other.

8. In a machine for harvesting plant products and the like, the combination of a conveyance adapted to travel a path along the location of such product, a suction tube mounted on the conveyance and having an open outer end adapted to draw in the product by suction, said suction tube being projectible to move said outer end along a line lateral of said path of travel, means applying fluid suction to an inner end of the tube for producing in the tube inward suction flow of sufficient velocity to draw in a plant product from the vicinity of the outer tube end, a straight-through suction controlling valve incorporated in the length of the projectible suction tube and movable therewith, said valve being formed of a resiliently flexible tubular member sealingly connected at its spaced ends with the wall of the suction tube, an intermediate portion of said tubular valve member resiliently taking an interiorly open form for fluid passage therethrough and being forcibly resiliently collapsible intermediate its ends to a flattened form to close the valve, means for collapsing said intermediate portion of the tubular member to hold it normally in said flattened closed form, means for intermittently projecting the suction tube,
sensing means selectively reactive to radiation reflected from the product only when in the vicinity of said projection line of the outer tube end,
and means controlled by such reaction of the sensing means and acting to deactivate said collapsing means to allow the tube to take its open form.

9. The combination defined in claim 8 and in which one end portion of the flexible tubular valve member is fixed with relation to the suction tube and the other end of said tubular valve member floats in the suction tube in sealed relation thereto.

10. The combination defined in claim 8 and in which said collapsing means includes physical means for bending and kinking the tube.

11. In a machine for harvesting plant products and the like, the combination of
   a conveyance adapted to travel a path along the location of such product,
   a substantially straight suction tube having an outer product receiving end and an inner delivery end and mounted on the conveyance for axial movement laterally of the path of travel of the conveyance,
   means applying fluid suction to the inner tube end for producing in the tube inward suction flow of sufficient velocity to draw in a plant product from the vicinity of the outer tube end,
   a straight-through suction controlling valve incorporated in the length of the suction tube and movable therewith, said valve being formed of a resiliently flexible tubular member sealingly connected at its spaced ends with the wall of the suction tube,
   an intermediate portion of said tubular member resiliently taking an interiorly open form for fluid passage therethrough and being forcibly resiliently collapsible to a flattened form to close the valve,
   a cylinder and piston unit connected to the suction tube to drive its axial movement,
   means normally applying superatmospheric fluid pressure externally to said tubular member portion to close the valve and to one cylinder end of said cylinder and piston unit to urge the suction tube axially inward,
   sensing means selectively reactive to presence of such product adjacent the outer tube end,
   and valve means acting in response to such reaction of the sensing means to relieve the external pressure on the tubular member to allow the valve to open, and acting also to apply superatmospheric pressure to the other cylinder end of said cylinder and piston unit to project the suction tube axially outward.

12. In a machine for harvesting plant products and the like, the combination of
   a conveyance adapted to travel a path along the location of such product,
   a plurality of essentially straight suction tubes carried on the conveyance in mutually spaced relation and having outer ends for intake reception of such product, and inner delivery ends opening directly into a common chamber,
   means for applying to said tubes inward suction flow of velocity sufficient to draw an approached product into and through a tube,
   each tube having a straight-through suction-controlling valve incorporated in its length and formed of a resiliently flexible tubular member sealingly connected at its spaced ends with the wall of the suction tube, an intermediate length portion of each valve member resiliently taking an interiorly open form for free passage therethrough of fluid and received products carried thereby, and said member portion being resiliently collapsible to bring opposing parts of its wall yieldingly together to close the valve and to yieldingly enclose any product trapped therein,
   a pilot valve for each suction tube normally acting to supply a fluid at superatmospheric pressure to the exterior of the tubular member portion of that suction tube to yieldingly collapse the same to close the tube valve, each pilot valve being actuatable to relieve the tubular member of said superatmospheric pressure to open the tube valve and cause suction flow in that individual suction tube,
   a sensor for each suction tube selectively reactive to the presence of such product in the vicinity of the outer end of that individual tube,
   and control mechanism for each suction tube acting under control of the sensor for that tube to actuate the associated pilot valve during said reaction of the sensor.

13. The combination defined in claim 12 and also including
   a rigid tubular member with one end entered sealingly into one end of the collapsible tube,
   said rigid tubular member having at its said end within the collapsible tube a pair of substantially opposite tapering wall projections that controllingly restrict the initial collapse thereof.

14. The combination defined in claim 12 and in which the suction tube is essentially a continuous tubular member throughout its length,
   and including a removable tube attached to and extending inwardly from the outer end of the suction tube, the inner end of said removable tube carrying the outer end of said tubular member with the latter's ends sealingly fitting the interior of the suction tube and removable therefrom with the removable tube.

15. The combination defined in claim 12, and also including
   structure forming two finger formations mounted internally of the tubular valve member and in diametrically opposite relation with respect thereto, said formations extending axially from one end toward the center of said intermediate length portion of the tubular member and acting to controlling restrict the initial collapse thereof.

16. The combination defined in claim 12, and in which each said tubular valve member has one end secured in sealed relation to its suction tube, and the other end movable substantially freely axially of its suction tube and in sealed relation therewith.

17. The combination defined in claim 16, and in which each tubular valve member has said one end releasably secured to its suction tube, and upon such release is removable bodily from the suction tube by axial movement through one end thereof.

18. In combination with a harvesting machine that comprises a frame, a picking tube having an outer product receiving end and mounted on the frame for outward axial projection relative thereto from a retracted position toward a plant product to be harvested, projection means actuatable to project the tube and to return the tube to retracted position, and means for producing in the tube inward suction flow of sufficient velocity to draw in a plant product from the vicinity of the outer end of the tube;
   resilient means tensionable in response to inward tube movement to retracted position,
   and means for releasing tension of the tensionable means in response to actuation of the projecting means to yieldingly urge tube projection.

19. The combination defined in claim 18, and in which said projection means comprise a pneumatic piston and cylinder unit connected to the picking tube and actuatable to exert on the picking tube a yielding outward force urging tube projection, said unit being reversible to exert on the tube a yielding inward force urging tube retraction and to continue such inward force during dwell of the picking tube in retracted position to maintain tension of said tensionable means.

20. In combination with a harvesting mcahine that comprises a frame, a picking tube having an outer product receiving end and mounted on the frame for axial projection and retraction movements with respect to a plant product to be harvested, and means for producing in the tube inward suction flow of sufficient velocity to draw in a plant product from the vicinity of the outer end of the tube;

stop means for limiting the outward projection movement of the tube at a predetermined projected position, tube driving means actuatable to exert on the tube a yielding outward force to project the tube, the tube driving means being reversible to exert on the tube a yielding inward force to retract the tube, actuating means for intermittently actuating the tube driving means, and control means acting to reverse the tube driving means during outward tube movement, so that said yielding inward force decelerates the tube before the latter reaches the stop means.

21. The combination defined in claim 20, and in which said control means include timing means initiated in action in timed relation to said actuation of the tube driving means and acting to reverse the tube driving means after a timed interval.

22. The combination defined in claim 20, and in which said tube driving means comprise a pneumatic piston and cylinder unit connected to the picking tube and valve means for controlling fluid pressure supply to the piston and cylinder unit, said valve means being actuatable to cause said unit to drive the tube yieldingly outward and being reversible to cause said unit to drive the tube yieldingly inward, said actuating means intermittently actuating the valve means, and said control means acting to reverse the valve means.

23. The combination defined in claim 22, and in which said actuating means comprise a sensor reactive to presence of such product in the vicinity of the outer end of the picking tube, and means for actuating said valve means in response to such reaction of the sensor, and said control means include timing means initiated in action in response to such reaction of the sensor and acting to reverse the valve means after a timed interval.

24. In combination with a harvesting machine that comprises a frame, a picking tube having an outer product receiving end and mounted on the frame for outward axial projection relative thereto from a retracted position toward a plant product to be harvested, piston means coupled to the tube for projecting and retracting the same, valve means having a normal position supplying fluid pressure via a first conduit to one side of the piston means to retract the tube, the valve means being actuatable to relieve said pressure and to supply fluid pressure via a second conduit to the other side of the piston means to project the tube, and means for producing in the tube inward suction flow of sufficient velocity to draw in a plant product from the vicinity of the outer end of the tube;

a switching valve connected in series with at least one of said conduits closely adjacent the piston means and acting, in response to relief of pressure supplied by said valve means to said one conduit, to open the corresponding side of the piston means substantially directly to atmospheric pressure.

References Cited

UNITED STATES PATENTS

| | | | |
|---|---|---|---|
| 844,410 | 2/1907 | Shauer. | |
| 858,371 | 7/1907 | Corley | 56—30 |
| 1,020,838 | 3/1912 | Neer. | |
| 1,225,193 | 5/1917 | Vittetoe | 56—30 |
| 2,088,676 | 8/1937 | White | 56—14 |
| 2,140,399 | 12/1938 | Connolly | 56—28 |
| 2,615,668 | 10/1952 | Ernest | 251—5 |
| 2,763,978 | 9/1956 | Graham et al. | 56—30 |
| 2,994,337 | 8/1961 | Freeman | 137—312 |
| 3,078,675 | 2/1963 | Baldwin | 60—52 |
| 3,145,967 | 8/1964 | Gardner | 251—5 |

RUSSELL R. KINSEY, *Primary Examiner.*